United States Patent [19]

Mase et al.

[11] Patent Number: 4,733,340

[45] Date of Patent: Mar. 22, 1988

[54] APPARATUS FOR STABILIZING TURBINE-GENERATOR SHAFT TORSIONAL OSCILLATIONS

[75] Inventors: Akira Mase, Hino; Atsushi Kurita, Koganei, both of Japan

[73] Assignee: Kabushiki Kaisha Toshiba, Kawasaki, Japan

[21] Appl. No.: 21,272

[22] Filed: Mar. 3, 1987

[30] Foreign Application Priority Data

Mar. 3, 1986 [JP] Japan ................... 61-45653

[51] Int. Cl.$^4$ .............................................. H02J 3/36
[52] U.S. Cl. ........................................ 363/35; 322/58; 363/44
[58] Field of Search ................ 363/35, 39, 44; 322/58

[56] References Cited

U.S. PATENT DOCUMENTS

| | | | |
|---|---|---|---|
| 3,883,792 | 5/1975 | Ellert | 321/9 R |
| 4,331,882 | 5/1982 | Hingorani | 307/129 |
| 4,377,780 | 3/1983 | Bjorklund | 363/35 |
| 4,551,780 | 11/1985 | Canay | 363/39 |

FOREIGN PATENT DOCUMENTS

0174520  3/1986  European Pat. Off. .
67-186978 11/1982 Japan .

OTHER PUBLICATIONS

C/GRE/1980, SC14-04, M. B. Bahrman et al.; pp. 1-9; "HUDC-Turbine-Generator Torsional Interactions—A New Design Consideration".
EMTP (Electro Magnetic Transients Program), developed by Bonneville Power Administration, Portland, Oregon, U.S.A.; 1982, IEEE, SM 006-5, I. M. Canay; "A Novel Approach to the Torsional Interaction and Electrical Damping of the Synchronous Machine," pp. 1-9.
IEEE 1979, 658-6, M. Barhman, E. V. Larson et al.; pp. 1-9; "Experience with HVDC-Turbine-Generator Torsional Interaction at Square Butte".

*Primary Examiner*—William H. Beha, Jr.
*Attorney, Agent, or Firm*—Schwartz, Jeffery, Schwaab, Mack, Blumenthal & Evans

[57] ABSTRACT

An apparatus for stabilizing turbine generator shaft torsional oscillations including: a current detector for detecting ac current of a turbine generator used in combination with a dc power-transmission system, a filter to which an output of said current detector is delivered, the filter comprising a first bandpass filter for detecting a sub synchronous component $(f_l-f_m)$ and a second bandpass filter for detecting a super synchronous component $(f_l+f_m)$ where a fundamental freuency of the generator is represented by $f_l$ and a natural frequency of the mechanical shaft system of the generator is represented by $f_m$, a calculation circuit for applying conversion of at least one of d and q axis to respective outputs from the first and second bandpass filters using a generator phase $\theta_G$ to take out at least one of $\Delta i_d$ and $\Delta i_q$ of the sub and super synchronous components, a third bandpass filter to which an output from the calculation circuit is fed, the third bandpass filter for taking out a stabilization signal therefrom, and a circuit for controlling a converter for delivering an output of the generator to the dc power-transmission system on the basis of the stabilization signal.

3 Claims, 9 Drawing Figures

APPARATUS FOR STABILIZING TURBINE-GENERATOR SHAFT TORSIONAL OSCILLATIONS

BACKGROUND OF THE INVENTION

The present invention relates to a stabilization apparatus in regard to interaction problems between turbine-generator shaft torsional oscillations and the dc transmission control system.

Dumping $D_m$ of the mechanical system of turbine-generators physically takes a positive value ($D_m<0$) although its value is small and is essentially stable. In the case of transmitting electric energy by the dc transmission, dumping $D_e$ of the electric system when viewed from the generator takes a negative value ($D_e<0$) by the influence of the constant current control considered as the fundamental control for the dc transmission in a low frequency range of 10 to 20 Hz ("HVDC-Turbine generator torsional interactions, A new design consideration" by M. P. Bahrman, E. V. Larsen et al. CIGRE SC14-04, 1980).

In the case where there exist some of natural frequencies of the mechanical shaft system of the turbine generator, which are included in such a low frequency range, when dc power becomes large, the resultant dumping ($D_m+D_e$) of the generator takes a negative value to become unstable. Thus, shaft torsional oscillations occur. For this problem, a stabilization scheme based on the dc control system is proposed.

Sub-synchronizing dumping control (which will be referred to as "SSDC" hereinafter) is effective for stabilization over an entire range of the shaft torsional frequency. When the turbine generator is expressed as N-mass model, there exist (N−1) natural frequencies. A circuit to collectively stabilize such oscillations is designed to apply the output of the stabilizing circuit to the output side of the current control regulator (which will be referred to as "ACR" hereinafter).

There are four problems to be considered in connection with interactions between turbine generator shaft torsional oscillations and the dc power-transmission system.

(1) It is considered that it is not simple to design a control system such that two closed loops for essential ACR and SSDC do not interfere with each other. For SSDC, an additional closed loop control is supplemented and its output is added to the output of ACR. Accordingly, it is considered that control design harmonized with the basic control is required for individual systems in order to obtain positive dumping ($D_e>0$) in the shaft torsional frequency range without damaging high response of the essential ACR.

(2) The know-how in regard to the detailed design of SSDC is so complicated that nobody understands other than developers. Such a detailed design includes a design to set dumping values over the entire range of the shaft torsional frequency to calculate frequency characteristic of SSDC for satisfying the set values to obtain high order transfer function to approximate to this, a design to obtain a transfer function of a feedback circuit for obtaining frequency characteristic of a desired open loop transfer function. Thus, the detailed design is complicated.

(3) The design of SSDC is dependent upon rather simple model in regard to the ac/dc system including the conventional basic control. Particularly in the case of the generator, since a simple voltage model on which only the angular velocity change $\Delta\omega$ is taken into account is used, a simulator study or field verification is assumed to be required for the stabilization scheme based thereon, when applied to the actual system.

(4) The stabilization signal is obtained by deriving an internal voltage of the generator from the ac bus voltage by the compensation of the generator current in order to obtain a stabilization signal close to $\Delta\omega$ of the generator as far as possible to input the internal voltage thus obtained to a frequency detector. However, it cannot be said that everything possible is done concerning the study as to whether or not any other signal can be used for the stabilization signal.

SUMMARY OF THE INVENTION

With the above study on the items (1) to (4) in view, an object of the present invention is to provide a stabilization apparatus which permits interactions between the control system of the dc transmission and the turbine generator shaft torsional oscillations to be reduced without damaging high response intrinsic to the dc transmission and hence is relatively easy to design.

To achieve this object, the present invention is implemented as follows. It is first assumed that the fundamental frequency of the turbine generator and the natural frequencies involved in mechanical shafts thereof are represented by $f_1$ and $f_m$, respectively. Subsynchronous component ($f_1-f_m$) and super synchronous component ($f_1+f_m$) are detected using bandpass filters, respectively. These components thus detected are subjected to the conversion on at least one of d and q axis using a generator phase $\theta_G$. Thus, at least one of $\Delta i_d$ and $\Delta i_q$ of the sub-synchronous component and the super synchronous component is taken out. By passing the component thus taken out through a bandpass filter, a stabilization signal is taken out. The stabilization signal thus obtained is used for control of converters in the dc transmission.

Namely, this stabilization signal is formed on the basis of the following parameters.

[1] d, q axis conversion variables $\Delta i_d$ and $\Delta i_q$ of the sub and super synchronous components which are sideband waves of the fundamental frequency current.

[2] Synchronous phase error $\Delta\theta_{ep}$ of a phase lock loop (which will be referred to as "PLL" hereinafter) of the synchronizing circuit.

The verification of the stabilization effect by the stabilization signal is based on the instantaneous value calculation of the ac/dc system including commutation of thyristors using EMTP (Electro Magnetic Transients Program developed by the Bonneville Power Administration in U.S.A.). The generator model of EMTP is developed for analysis of shaft torsional oscillations of this kind. N-masses model including respective stages of the turbine, e.g., high, medium and low pressure turbines and the generators as mass points is assumed. The control system therefor, particularly PLL for phase control simulates the system equivalent to the actual one. Accordingly, the verification is possible in a manner close to the actual system.

For the time being, there is no simulator for the turbine generator, which is capable of simulating multimass point comparable to the actual system. Accordingly, it is regarded as the best that the verification of the analysis of the shaft torsional oscillations is based on the EMTP simulation.

The stabilization mechanism of the shaft torsional oscillations using a phasor diagram and the action of the stabilization signal will be now described.

Consideration is taken in connection with changes due to the shaft torsional oscillations as the electric torque $T_e$ and the generator rotor speed $\omega$ under condition where the mechanical shaft torsional system is opened in the ac/dc closed loop.

$$\Delta T_e/\Delta\underline{\omega}=D_e+jK_e \quad (1)$$

For consideration of changes expressed as phasors $\Delta T_e$ and $\Delta\underline{\omega}$, the real part of the right side of the equation (1) is defined as the electric dumping $D_e$ (p.u.). The outline of the $D_e$ calculation method having been developed is as follows.

Each valve commutation is calculated in terms of the three phase instantaneous value to separate the valve current into sub and super synchronous components which are sideband waves of the fundamental frequency by the Fourier analysis. The sub and super synchronous components thus obtained are subjected to d, q axis conversion to interface with the generator. The generators are modeled by Park's equation. The convergence of $\Delta\omega$ and other changes is obtained by the iteration. Thus, $D_e$ is obtained as the real part of the phasor $\Delta T_e/\Delta\underline{\omega}$.

Since the dc control system essentially consists of the constant current control and ac component $\Delta i_{dc}$ is superimposed on dc current due to the shaft torsional oscillation, the control angle $\alpha$ changes by variation $\Delta\alpha$. The $\Delta\alpha$ is composed of two components as described below.

$$\Delta\alpha=\Delta\alpha_R+\Delta\theta_{ep} \quad (2)$$

These components are a $\Delta\alpha_R$ (electric angle) related to the regulator output $\Delta e_R$ (volt) by the feedback of $\Delta i_{dc}$ and a synchronous phase error $\Delta\theta_{ep}$, respectively.

The synchronizing circuit has an AC bus voltage as its input and is synchronized by PLL. AC bus voltage phase $\Delta\theta_{AC}$ due to the shaft torsional vibration is calculated from the generator phase $\Delta\theta_G$. The phase relationship therebetween is shown in FIG. 2.

An angle with respect to the q axis of the generator is referred to as $\delta_{AC}$ as the AC bus voltage $V_{AC}=ed+je_q$. From the phasor diagram in FIG. 2, the following relationships are obtained.

$$\theta_{AC}-\theta_G=\pi/2-\delta_{AC}$$

$$\tan\delta_{AC}=e_d/e_q$$

When the above equation is linearized, the following relationships are obtained.

$$\Delta\theta_{AC} = \Delta\theta_G - \Delta\delta_{AC}$$

$$\Delta\delta_{AC} = \frac{\Delta e_d\cos\delta_{ACO} - \Delta e_q\sin\delta_{ACO}}{e_{do}\sin\delta_{ACO} + e_{qo}\cos\delta_{ACO}}$$

Since $\Delta e_d$ and $\Delta e_q$ have been calculated in the calculation of $D_e$, $\Delta\theta_{AC}$ can be calculated from the above equation.

If the frequency bandwidth of the closed loop of PLL is approximately 5 Hz, the synchronous output $\Delta\theta_{op}$ for the shaft torsional oscillation of 10 to 20 Hz is delayed with respect to $\Delta\theta_{AC}$, resulting in occurrence of the synchronous phase error $\Delta\theta_{ep}$. The relationship therebetween is shown in the following equation (3).

$$\Delta\theta_{AC}-\Delta\theta_{op}=\Delta\theta_{ep} \quad (3)$$

When the transfer function of the closed loop of PLL is expressed in a quadratic form, $\Delta\theta_{ep}$ is expressed as follows:

$$\Delta\theta_{ep}(s) = F_p(s)\Delta\theta_{AC}(s), \quad (4)$$

$$F_p(s) = \frac{S^2}{S^2 + 2\zeta\omega_n S + \omega_n^2}$$

Further, when the characteristic parameter of PLL is given, phasor $\Delta\theta_{ep}(j\omega_m)$ is calculated as $S=j\omega_m$ and $\omega_m=2\pi f_m$ for sinusoidal wave excitation due to the shaft torsional oscillations.

FIG. 3 illustrates the relationships expressed as the above-mentioned equations (2) and (4) on the output side of the regulator wherein bars attached to symbols indicative of changes denote vectors. In addition, $\Delta e_{syn}$ is obtained by applying voltage conversion to $\Delta\theta_{ep}$ (rad/electric angle).

If the stabilization signal $\Delta e_{st}$ is not considered, the relationship expressed as the following equation (5) holds, which corresponds to the equation (2).

$$\Delta e_{c2}=\Delta e_R+\Delta e_{syn} \quad (5)$$

In this equation, $\Delta e_{c2}$ corresponds to $\Delta\underline{\alpha}$ and $\Delta\underline{\alpha}$ denotes a net change of the control angle with respect to zero point of the actual commutation voltage. Accordingly, $\Delta e_{c2}$ can be regarded as an effective change of the phase control signal $e_c$.

As well known, the dc voltage decreases as the control angle increases. Accordingly, since there exists a relationship such that when $\Delta\alpha>0$, $\Delta V_{dc}<0$, whereas when $\Delta\alpha<0$, $\Delta V_{dc}>0$, there is a tendency to have a relationship such that $\Delta e_{c2}$ and $\Delta V_{dc}$ are opposite to each other in phase. The ac component $\Delta V_{dc}$ of the dc voltage produces $\Delta i_{dc}$ through the dc transmission impedance $Z_{dc}(j\omega)$.

$$\Delta i_{dc}=\Delta V_{dc}/Z_{dc}(j\omega) \quad (6)$$

Assuming now that $\Delta i_{dc}$ is produced from $\Delta e_{c2}$, the corresponding numerical gain, i.e., $\Delta i_{dc}/\Delta e_{c2}$ does not so much change with respect to individual shaft torsional frequency. Further, since the phase difference between $\Delta i_{dc}$ and $\Delta T_e$ is relativley small in the isolated dc transmission according to the calculated result, it is considered that the phase difference between $\Delta e_{c2}$ and $\Delta T_e$ does not so much change.

On the basis of the qualitative tendency of the above-mentioned various phasors, the stabilization mechanism of the shaft torsional oscillations will be now considered. The tendency of various phasors obtained by the $D_e$ calculation is shown in FIG. 4(a). This represents the relationship of the equation (5) showing the example where the stabilization signal is off and $D_e<0$.

(1) An angle $\theta_s$ that $\Delta T_e$ and $\Delta 107$ form is greater than 90 degrees, which corresponds to $D_e<0$.

(2) An angle that $\Delta\underline{\omega}$ and $\Delta\theta_G$ form is $\pi/2$ (rad.).

(3) An angle $\theta_{syn}$ that $\Delta\theta_G$ and $\theta e_{syn}$ form is equal to $\angle F_p(j\omega_m)$ (cf. equation (4)).

By introducing the stabilization signal $\Delta e_{st}$, stabilization will be now considered (FIG. 4(b)). A resultant signal $\Delta e_{c1}$ of the regulator output $\Delta e_R$ and the stabilization signal $\Delta e_{st}$ is obtained (FIG. 3).

$$\Delta e_{c1} = \Delta e_R - \Delta e_{st} \qquad (7)$$

In this case, if $\Delta e_R$ of ACR is delayed by $-\Delta e_{st}$, $\Delta e_{c2}$ lags. Assuming that the phase of $\Delta\omega$ is constant, the phase of $\Delta e_{syn}$ also does not change and the delay of $\Delta e_{c2}$ delays $\Delta i_{dc}$ and $\Delta T_e$. Thus, when $\Delta T_e$ lags $\Delta\omega$ by a phase angle more than 270 degrees, the phase difference is expressed as $\theta_s < 90$ degrees ($D_e > 0$).

For the stabilization signal, a signal which slightly leads an inverted signal of $\Delta e_R$ is suitable. It is required to constitute such a signal with signals directly available at the converter station. A stabilization signal is chiefly formed by the above-described two kinds of signals. By introducing the stabilization signal thus obtained as an axiliary signal using the $D_e$ calculation method, stabilization is confirmed.

DETAILED DESCRIPTION OF THE PREFERRED EMBODIMENT

The present invention will be described in detail in connection with a preferred embodiment with reference to attached drawings.

Figure 1:
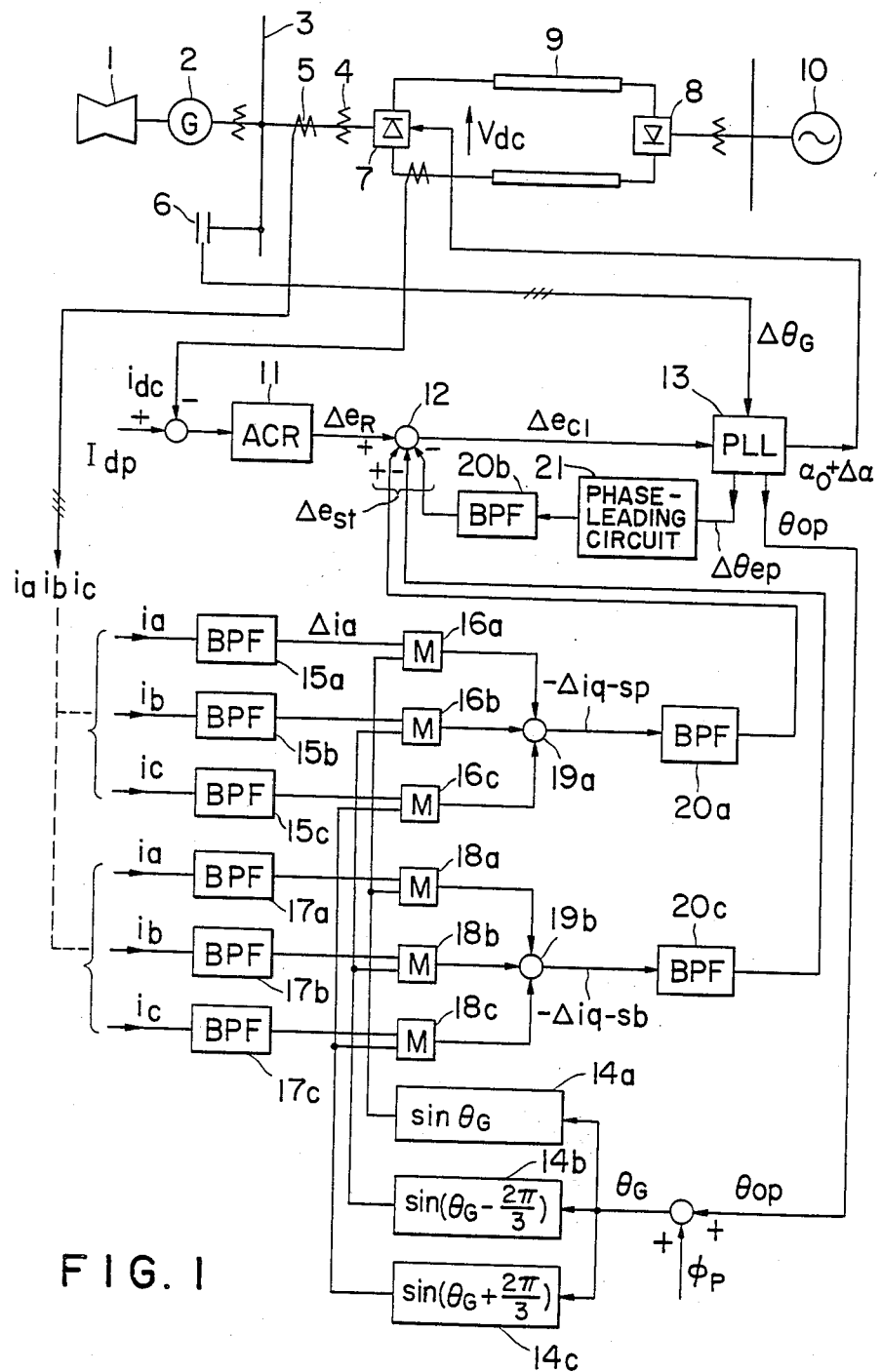
FIG. 1 is a block diagram illustrating the configuration of an embodiment according to the present invention.
Figure 2:
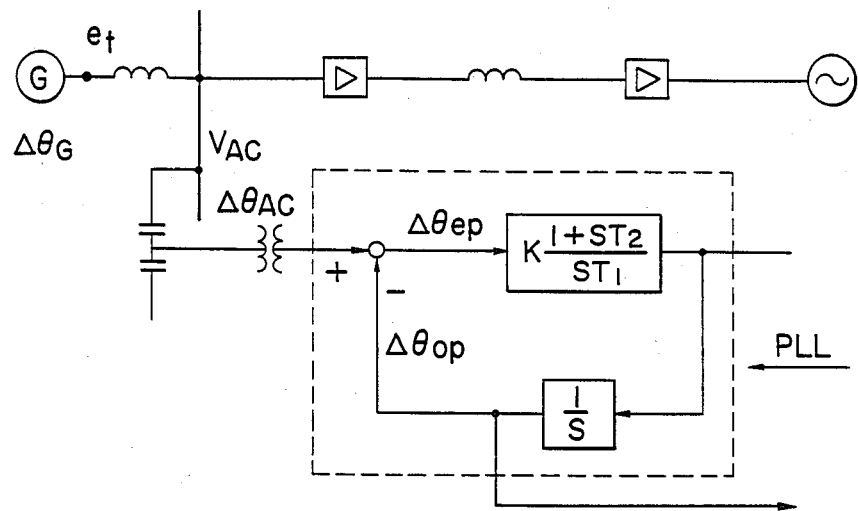
FIG. 2 is a block diagram illustrating the configuration of PLL used in a synchronizing circuit.
Figure 2A:
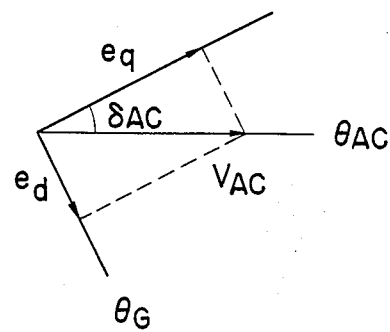
Figure 3:
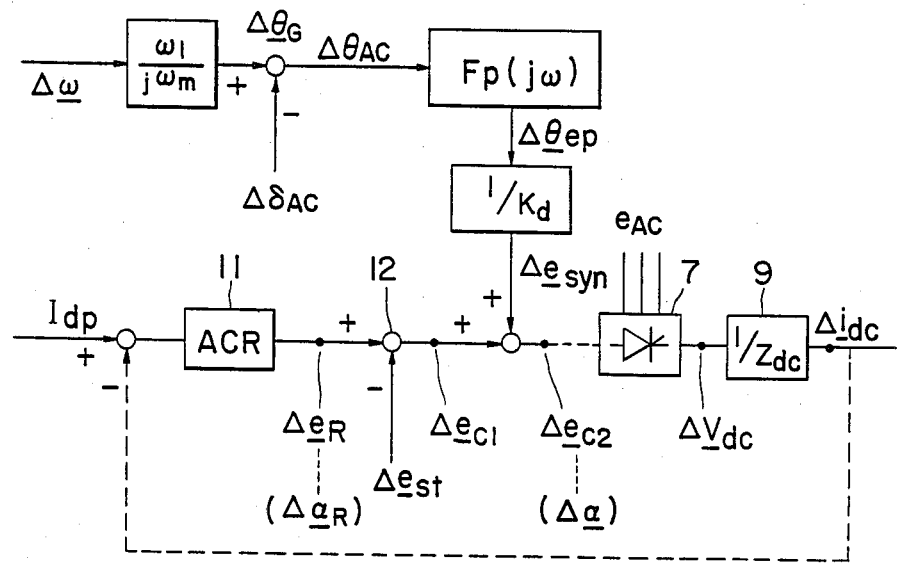
FIG. 3 is a block diagram illustrating the configuration of a circuit which deals variation $\Delta\alpha$ of the control angle and the synchronous phase error $\Delta\theta_{ep}$.
Figure 4A:
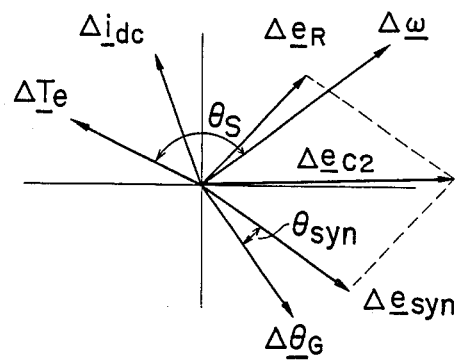
FIG. 4(a) is a phasor diagram showing calculated examples of various phasors in $D_e$ calculation in connection with the current control loop shown in FIG. 3.
Figure 4B:
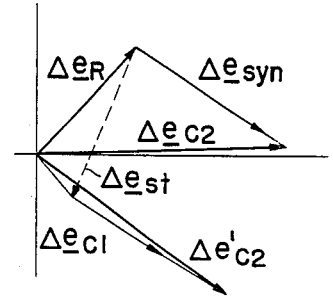
FIG. 4(b) is a phasor diagram showing the stabilization mechanism.

FIG. 1 shows, in a block form, an example of the configuration of an apparatus according to the present invention. In this example, the generator is assumed to be the five-mass model, viz., the model comprising high, medium and two low pressure turbines, and the generator itself. In the example of this model, there appear four shaft torsional frequencies ($f_m$) of 8.33, 16.6, 21.5 and 22.5 Hz. In the following discussion, these frequencies will be handled with their being classified into three groups, i.e., about 10 Hz, 10 to 20 Hz and more than 20 Hz.

Initially, in the case that the shaft torsional frequency $f_m$ is approximately 10 Hz, a signal derived from the super synchronous component is used as the stabilization signal. Three phase currents $i_a$, $i_b$ and $i_c$ on the primary side of a converter transformer 4 are employed as an input of the apparatus. By passing these three phase currents through a bandpass filter (which will be referred to as "BPF" hereinafter) 15 of the resonant frequency ($f_1 + f_m$), super synchronous components $\Delta i_a$, $\Delta i_b$ and $\Delta i_c$ are obtained wherein $f_1$ denotes a fundamental frequency. For applying d, q axis conversion to these three phase variables, sin and cos of the phase angle $\theta_G$ of the generator is multiplied. Thus, $\Delta i_{q-sp}$ and $\Delta i_{d-sp}$ are obtained from the super synchronous component. It is to be noted that multiplication of cos can be omitted as described later.

$$-\Delta i_{q-sp} = \Delta i_a \sin\theta_G + \Delta i_b \sin(\theta_G - 2\pi/3) + \Delta i_c \sin(\theta_G + 2\pi/3) \qquad (8)$$

$$i_{d-sp} = \Delta i_a \cos\theta_G + \Delta i_b \cos(\theta_G - 2\pi/3) + \Delta i_c \cos(\theta_G + 2\pi/3) \qquad (9)$$

For obtaining $\theta_G$, application of a phase output $\theta_{op}$ of a PLL 13 of the synchronizing circuit is considered. Since there is a phase difference $\Phi_p$ therebetween in general, this phasse difference is taken into account.

$$\theta_G = \theta_{op} + \Phi_p$$

By inputting $\theta_G$ to a function generator 14, sin function is generated. The sin function thus obtained is multiplied by the previously described $\Delta i_a$, $\Delta i_b$ and $\Delta i_c$ at a multiplier 16. By summing outputs from the multiplier 16, $-\Delta i_{q-sp}$ corresponding to the equation (8) is obtained. By passing $-\Delta i_{q-sp}$ through a BPF 20a of the resonant frequency $f_m$, a stabilization signal $\Delta e_{st}$ is prepared. The stabilization signal $\Delta e_{st}$ thus obtained is subjected to summing operation on the output side of the constant current control regulator 11.

In regard to Q factor of BPF, as an example, Q factors of the input and output BPFs 15 and 20 are 5 and 1, respectively.

In the case of 10 Hz $< f_m <$ 20 Hz, a synchronous phase error $\Delta\theta_{ep}$ of the PLL 13 is used as the stabilization signal. This $\Delta\theta_{ep}$ is subjected to subtracting operation on the output side of the regulator 11 through a phase-leading circuit 21 and the BPF 20b of the resonant frequency $f_m$.

In the case of $f_m \geq 20$ Hz, a quantity of $-\Delta i_{q-sp}$ derived from the sub synchronous component is used as the stabilization signal. In this case, the previously described super synchronous component is solely replaced with the sub synchronous component, but the configuration is just the same as the previous case. The configuration in this case includes an input BPF 17 of a resonant frequency ($f_1 - f_m$), a multiplier 18, an adder 19b, and an output BPF 20c of the resonant frequency $f_m$. It is to be noted that the polarity of the adder 12 is minus.

In this embodiment, the practically unacceptable frequency range of the shaft torsional oscillation mode frequency is assumed to be 8 to 25 Hz. As a result of the EMTP calculation, it has been seen that it is suitable for attainment of attenuation effect over the entire mode to divide the above-mentioned frequency range into high, medium and low frequency ranges to apply the stabilization signal thereto.

In the application of the stabilization signal, care must be taken in the following problems.

(1) Commonly using the stabilization signal in two modes is not preferable because respective attenuation effects are reduced. This is due to the fact that the gain of the stabilization signal for each mode is required to be reduced to one half in view of suppression of higher harmonic ripples.

(2) Since the stabilization effect of the sub/super synchronous component has strong frequency dependency, suitable selection is required.

(3) There is an interference between modes of the stabilization signal. Particularly, when frequencies in the medium and high modes are relatively close to each other, there is a tendency that such an interference occurs.

The stabilization is confirmed on the basis of the $D_e$ calculation in connection with respective stabilization signals and the detailed explanation will be made as follows.

(1) Synchronous phase error $\Delta\theta_{ep}$ ($\Delta e_{syn}$)

There is a tendency that according as this signal is stabilized, an angle that this signal and the regulator output $\Delta e_R$ form becomes small. By inverting the polarity, a vector to cancel $\Delta e_R$ is obtained. Thus, $\Delta\theta_{ep}$ is easily taken out. Since PLL has the AC bus voltage as synchronous input, this value is assumed to be delayed a little as compared to $\Delta\theta_{ep}$ calculated from $\Delta\omega$ of the generator. The phase-leading circuit 21 corrects this delay. The $D_e$ calculation including this stabilization signal is performed. Thus, the synchronizing phase error $\Delta\theta_{ep}$ ($\Delta e_{syn}$) is stabilized. The result of $D_e > 0$ is obtained.

(2) Super/sub synchronous component

When the fundamental frequency and the shaft torsional frequency are represented by $f_1$ and $f_m$, respectively, there occur in the generator current, a so called sub synchronous component having a frequency $(f_1-f_m)$ and a super synchronous component having a frequency $(f_1+f_m)$ in addition to the fundamental wave having the frequency $f_1$. Since these current components are naturally included in the converter current in the isolated dc-transmission, they are calculated by Fourier analysis. Thus, such components are intended to be used as the stabilization signal.

For shortening one time period of the Fourier analysis, $f_m$ is selected so that $f_1/f_m$ makes a suitable ratio of integer. For example, in the system where the fundamental wave has a frequency $f_1$ of 50 Hz, it is sufficient that four cycles of the fundamental wave form one time period of the Fourier analysis when $f_m=12.5$ Hz. From the analysis of the three phase current of the converter, $(f_1 \pm f_m)$ can be regarded as positive sequence components, respectively. In addition, since $(f_1 \pm f_m)$ components can be regarded as changes with respect to the fundamental $f_1$ component, they are subjected to d, q axis conversion, whereby $\Delta i_d$ and $\Delta i_q$ are obtained. In accordance with the conversion formula from well known three phase currents $i_a$, $i_b$ and $i_c$ to $i_d$ and $i_q$, the conversion formula is performed by multiplying sin and cos of the phase angle $\theta_G$ of the generator by the above three phase currents. When changes of $i_d$ and $i_q$ are subjected to linearization, the following relational equations (10) and (11) are obtained.

$$\Delta i_d = -I_{sb}\sin\{(\omega_1 - \omega_{sb})t - \Phi_{sb} - \Phi_G\} \quad (10)$$
$$+ I_{sp}\sin\{(\omega_{sp} - \omega_1)t + \Phi_{sp} + \Phi_G\}$$
$$- I_{ac1}\{\cos(\Phi_G + \Phi_{ac1})\}\Delta\theta_G$$

$$\Delta i_q + -I_{sb}\cos\{(\omega_1 - \omega_{sb})t - \Phi_{sb} - \Phi_G\} \quad (11)$$

$$-I_{sp}\cos\{(\omega_{sp} - \omega_1)t + \Phi_{sp} + \Phi_G\}$$
$$-I_{ac1}\{\sin(\Phi_G + \Phi_{ac1})\}\Delta\theta_G$$

It is to be noted that when three phase currents are represented by $i_{ao}+\Delta i_a$, $i_{bo}+\Delta i_b$ and $i_{co}+\Delta i_c$, the steady state current of phase a and its change are expressed as follows:

$$i_{ao} = I_{ac1}\sin(\omega_1 t + \Phi_{ac1}) \quad (12)$$

$$\Delta i_a = I_{sb}\sin(\omega_{sb}t + \Phi_{sb}) + I_{sp}\sin(\omega_{sp}t + \Phi_{sp})$$

Both steady state currents of phases b and c and their changes are shifted by $2\pi/3$ and $4\pi/3$ with respect to the equation (1), respectively.

There are relationships related to the phase of the generator as shown below.

$$\theta_G = \theta_{GO} + \Delta\theta_G, \theta_{GO} = \omega_1 t - \Phi_G,$$

$$\omega_{sb} = 2\pi(f_1 - f_m),$$

$$\omega_{sp} = 2\pi(f_1 - f_m)$$

As seen from the equations (10) and (11), $\Delta i_d$ and $\Delta i_q$ consist of three components, respectively. By phasor representation, there can be compared with the above-described phasors related to the stabilization mechanism.

Equations (10) and (11) are represented by phasor.

$$\Delta I_d = \Delta I_{d-sb} + \Delta I_{d-sp} + K_1 \Delta\theta_G$$

$$\Delta I_q = \Delta I_{q-sb} + \Delta I_{q-sp} + K_2 \Delta\theta_G \quad (13)$$

Figure 5A:
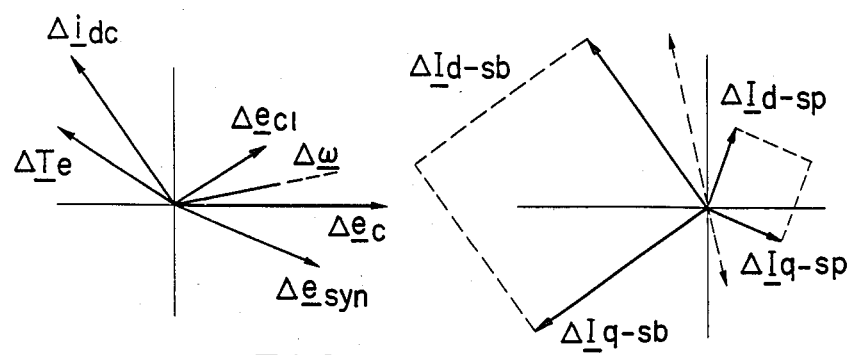
FIG. 5(a) is a phasor diagram showing the phase relationship between phasors derived from sub/super synchronous components and control signal having been calculated in the case of $f_m = 8.33$ Hz.

It is to be noted that instantaneous values (t representation) are assumed to be equal to the imaginary part of phasor. An example of calculation is shown in FIG. 5(a) wherein phasors having been explained in relation to the stabilization mechanism and phasors derived from sub/super synchronous components are shown on the left and right sides, respectively. In the $D_e$ calculation, the stabilization phasor of the super synchronous component with respect to the lower frequency mode is given as follows.

$$\Delta e_{st} = (\Delta I_{d-sp} + \Delta I_{q-sp})^* K, K > 0 \quad (14)$$

This phasor is added to the regulator output $\Delta e_R$ as $-\Delta e_{st}$ (equation (7)).

Figure 5B:
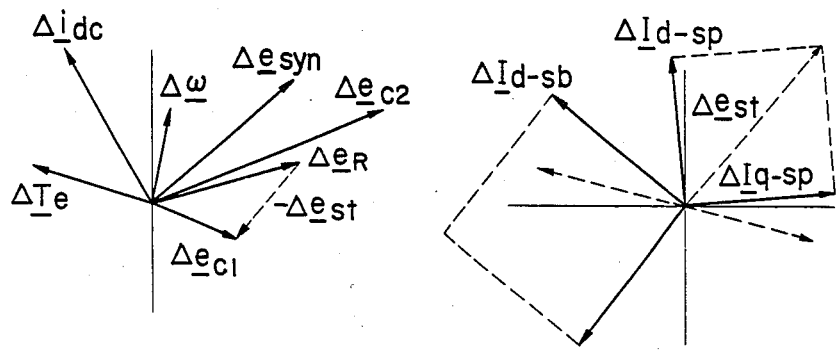
FIG. 5(b) is an explanatory view showing a method of forming stabilization phasors by the super synchronous component.

The stabilized $D_e$ calculation result is shown in FIG. 5(b). $-\Delta I_{q-sp}$ which is the phasor representation of $-\Delta i_{q-sp}$ corresponds to the equation (14). It is to be noted that the phase of the phasor equivalent to the equation (14) is obtained by leading the phase of $\Delta I_{q-sp}$ by $\pi/4$ without using $\Delta I_{d-sp}$.

In the sin function generator 14 in FIG. 1, when $\theta_G$ is substitued for $(\theta_G - \pi/4)$, the phasor $\Delta I_{q-sp}$ lead by a phase angle of $+\pi/4$.

Accordingly, it is sufficient that the phase difference $\Phi_p$ for adjustment for obtaining $\theta_G$ of the generator from $\theta_{op}$ of PLL is substituted for $\Phi_p - \pi/4$. Thus, the calculation of $\Delta I_{d-sp}$ becomes unnecessary. As a result, the calculation of the cos function corresponding to the sin function can be omitted.

The adjustment phase $\Phi_p$ permits the phase adjustment of the stabilization phasor, but is basically a fixed angle. For example, for EMTP, $\Phi_p$ is a constant as defined below.

Since the synchronous phase output $\theta_{op}$ is coincident with the input phase $\theta$ in a steady state when the ac bus voltage of the converter is assumed to be a synchronous input of PLL, the ac bus voltage $e_a$ is expressed as follows.

$$e_a = E_a \cos\theta = E_a \cos\theta_{op} \quad (15)$$

On the other hand, when the phase angle of the generator is represented by $\theta_G$, the ac bus voltage $e_a$ is expressed, in accordance with EMTP, as follows.

$$e_a = e_d \cos\theta_G + e_q \sin\theta_G = \quad (16)$$

$$\sqrt{e_d^2 + e_q^2} \cos\left(\theta_G - \frac{\pi}{2} - \delta_s\right)$$

$$\tan\delta_s = -e_d/e_q, \quad e_d < 0$$
$$e_q > 0$$

By allowing the equations (15) and (16) to correspond to each other, $\Phi_p$ is calculated as follows.

From $\theta_G - \pi/2 - \delta_s = \theta_{op}$, $\Phi_p = \pi/2 + \delta_s$ is obtained.

In FIG. 1, the quantity $-\Delta i_{q-sb}$ derived from the sub synchronous component is taken as the stabilization signal over the higher frequency mode. The reason why its polarity in the adder 12 is taken in a manner opposite to that of the super synchronous component is that $\Delta I_{q-sb}$ has substantially antiphase relationship with respect to $\Delta I_{q-sp}$ in principle, (FIGS. 5(a) and 5(b). FIGS. 5(a) and 5(b) show an example of calculation of lower frequency mode. Such a tendency does not change for higher frequency mode.

The reason why a quantity derived from the super synchronous component is used for the lower frequency mode and a quantity derived from the sub synchronous component is used for the higher frequency mode is as follows.

By rewriting $\Delta\theta_G/\Delta\underline{\theta}_G$ for instantaneous value/phasor with $\epsilon/\underline{\epsilon}$, these parameters are defined as follows.

$$\Delta\theta_G = \epsilon = \bar{\epsilon}\sin\omega_m t$$

$$\Delta\underline{\theta}_G = \underline{\epsilon} = \bar{\epsilon}e^{j\omega_m t} \quad (18)$$

where $\omega_m = 2\pi f_m$ and $f_m$ is shaft torsional frequency.

Then, by applying the phasor relationship expressed as $\Delta\underline{\theta}_G = \underline{\epsilon}$ to the above-mentioned equation (13), phasors $I_{d\epsilon}$ and $I_{q\epsilon}$ are defined.

$$\Delta I_d/\underline{\epsilon} = I_{d\epsilon-sb} + I_{d\epsilon-sp} + K_1 = I_{d\epsilon}$$

$$\Delta I_q/\underline{\epsilon} = I_{q\epsilon-sb} + I_{q\epsilon-sp} + K_2 = I_{q\epsilon} \quad (19)$$

$I_{d\epsilon}$ and $I_{q\epsilon}$ are obtained by dividing respective terms of the right side of the equation obtained with individual $D_e$ calculation by $\underline{\epsilon}$. $D_e$ is calculated as the real part of $\Delta T_e/\Delta\underline{\omega}$ as follows. As well known, $\Delta T_e$ is first expressed as follows.

$$\Delta T_e = [E_{fd} - (x_d - x_q(p))i_{d0}]\Delta i_q + \quad (20)$$

$$(x_q - x_d(p))i_{q0} \cdot \Delta i_d + G(p) \cdot i_{q0} \cdot \Delta e_{fd}$$

Assuming that the AVR effect of the third term of the right side is negligible, when $p = j\omega_m$(pu), the phasor representation of the equation (20) is as follows.

$$\Delta T_e = [E_{fd} - (x_d - x_q(j\omega_m))i_{d0}]\Delta I_q + (x_q - x_d(j\omega_m))i_{q0} \cdot \Delta I_d \quad (21)$$

Further, $\Delta I_q$ and $\Delta I_d$ are replaced with $\underline{\epsilon} \cdot I_{q\epsilon}$ and $\underline{\epsilon} \cdot I_{d\epsilon}$ using the equation (19), respectively. The phasor $\Delta\underline{\omega}$ is expressed as follows.

$$\Delta\underline{\omega} = \frac{d}{dt}\underline{\epsilon} = (j\omega_m)\underline{\epsilon} \quad (22)$$

Dividing equation (21) by equation (22) to obtain the real part $D_e$, $D_e$ is expressed as follows.

$$D_e = \left(\frac{D - jC}{2\omega_m}\right)I_{d\epsilon} + \left(\frac{B - jA}{2\omega_m}\right)I_{q\epsilon} + \quad (23)$$

$$\left(\frac{D + jC}{2\omega_m}\right)I_{d\epsilon}^* + \left(\frac{B + jA}{2\omega_m}\right)I_{q\epsilon}^*$$

where * represents conjugate phasor, and A, B, C and D represent positive constants obtained from the generator constant and have the relationship expressed as $A >> B$, $C >> D$.

Accordingly, when phasors which respectively lag the phasors $I_{d\epsilon}$ and $I_{q\epsilon}$ by 90 degrees are prepared, $D_e$ is substantially proportional to the real parts thereof.

The contribution to $D_e$ of the super/sub synchronous components is obtained as follows.

The super/sub synchronous component is composed of the following two components. These components are expressed using phasors $I_{d\epsilon}$ and $I_{q\epsilon}$ as follows:

(a) The contribution based on a change $\Delta I = \Delta i_d + j\Delta I_q$ of the generator current.

sub component $= -(I_{q\epsilon}^* - jI_{d\epsilon}^*)\bar{\epsilon}/2$ super component $= (I_{q\epsilon} - jI_{d\epsilon})\bar{\epsilon}/2 \quad (24)$ (b) The contribution based on a change of the phase of the steady state value $\bar{I}_0 = i_{d0} + jI_{q0}$ of the generator current.

sub component $= -(i_{d0} + ji_{q0})\bar{\epsilon}/2$ super component $= (i_{d0} + ji_{q0})\bar{\epsilon}/2 \quad (25)$ The sum of the above-mentioned (a) and (b) gives the sub/super synchronous components.

When the above four vectors are resolved in directions of the phasors $I_{d\epsilon}$ and $I_{q\epsilon}$, respectively, the contribution to $D_e$ can be seen from the equation (23). The above four phasors have been calculated in connection with respective stable/unstable examples of the shaft torsional oscillations of three frequencies of 8.33, 16.67 and 20.0 Hz, and the phasors contributing to $D_e > 0$ have been studied. As a result, it has been that the following two frequencies have such a tendency.

(a) super synchronous component of the low frequency (8.33 Hz).
(b) sub synchronous component of high frequency (20 Hz).

Others have a small effect with respect to $D_e$ ($D_e \approx 0$) or adversely contribute to $D_e < 0$.

The reason why the super/sub synchronous components of the above (a) and (b) are used has been stated above.

ADVANTAGES WITH THE EMBODIMENT

Figure 6A:
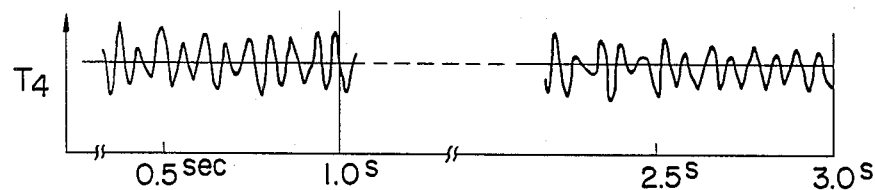
FIGS. 6(a) and 6(b) show the shaft torques with and without the stabilization signal respectively to indicate the effect of the present invention on the shaft torsional oscillation.

The advantages with the present invention are demonstrated by digital simulation based on EMTP. When shaft torsional oscillations are excited due to a rapid deblock of 100% of the dc transmission system, the comparison between off and on of the stabilization signal in connection with the shaft torque $T_4$ between a generator and the adjacent turbine which is not shown is shown in FIGS. 6(a) and (b). In this example, the stabilization signals of FIG. 1 are used.

In the $D_e$ calculation, the effects with the single stabilization signal are calculated in connection with the corresponding shaft torsional frequency. Further, the mechanical torsional system is opened to calculate $D_e$ in the open loop. On the other hand, the actual system has four shaft torsional mode frequencies in this example. Since three stabilization signals are applied thereto, it is necessary to verify that attenuation effect in the closed loop including the mechanical system in the same manner as in the actual system. The whole attenuation tendency can be seen from FIG. 6 when the stabilization signals are on, but attenuation of each mode cannot be seen. Accordingly, Fourier analysis of the waveforms are conducted to compare them. An example of this calculation is shown in Table 1.

TABLE 1

The effects of stabilization signals

Figure 6B:
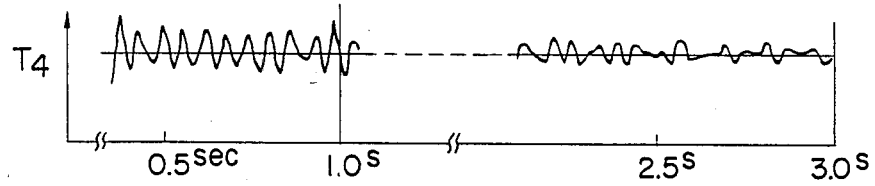

| mode | OFF 1 | OFF 2 | OFF 3 | ON 1 | ON 2 | ON 3 | Note |
|---|---|---|---|---|---|---|---|
| 1 | 10.5% | 6.3 | 9.0 | 7.5% | 4.5 | 3.0 | time in seconds OFF: FIG. 6(a) |
| 2 | 27.5 | 26.0 | 24.0 | 21.0 | 14.5 | 7.0 | |
| 3 | 4.0 | 2.5 | 5.0 | 4.5 | 1.0 | 2.5 | ON: FIG. 6(b) |
| 4 | 8.1 | 6.5 | 3.0 | 8.3 | 6.5 | 4.0 | |

Table 1 shows a transient attenuation of a shaft torsional oscillation having a large amplitude at the earlier stage of disturbance when the stabilization signal is off. It is assumed that shaft torsional oscillations of the first and second modes last thereafter, i.e., do not naturally attenuate. The reason is that the $D_e$ calculation results related thereto show $D_e \leq -2.0$ pu at the dc loading of 100%, respectively.

On the other hand, there is a tendency that all the modes attenuate in the application of three kinds of stabilization signals in FIG. 1. When the stabilization signals of the first and second modes are on and the stabilization signals of higher modes (the third and fourth modes) are off, shaft torsional oscillations of the first and second modes exhibit better attenuation effect rather than in Table 1. In contrast, shaft torsional oscillations of higher modes have poor attenuation effect and turn to lasting or increasing tendency. When stabilization signals of all modes are off, there appears natural attenuation tendency for higher modes (Table 1). This is assumed to result from the fact that the characteristic of $D_e$ essentially shows $D_e > 0$ in higher frequency range. This is also assumed to originate from the fact that when stabilization signals of the first and second modes are applied, higher modes are caused to exhibit $D_e < 0$ as a reaction thereof.

Accordingly, stabilization signals are required even for higher modes in order to obtain the attenuation tendency over the entire mode, resulting in the necessity of the configuration in FIG. 1.

OTHER EMBODIMENT

Since there is a tendency that the stabilization signal of the higher mode interferes with the stability effect of the second mode, an on/off control of the higher frequency signal is assumed to be conducted. First, in the case of failure of the ac/dc system, when a shaft torsional oscillation is excited to much extent, the stabilization signal of the higher frequency mode is turned off for about 3 sec. At this time period, effective attenuation of the first and second modes is obtained by two stabilization signals of the first and second modes. For further enhancing the attenuation effect, addition of a $\Delta f$ signal is effective. When $\Delta f$ obtained from the ac bus voltage through a frequency sensor is used together with stabilization signals of the first and second modes, it is realized by the EMTP simulation that the stabilization signals of the first and second modes attenuate below 2% in about 3 sec. In contrast, when only $\Delta f$ is used, the attenuation effect of the first and second modes can be hardly anticipated. In this instance, $\Delta f$ is added in consideration of the polarity on the output side of the regulator without using BPF, etc.

On the other hand, the higher mode occupies the greater part of residual ripples of the shaft torsional oscillation by the stabilization signal placed in off state after 3 sec. have passed. At this stage, by making use of the stabilization signal of the higher mode, the higher mode is caused to attenuate. For the first and second modes, they attenuate below about 2% for the first 3 sec. and after the higher frequency signal is turned on the state of $D_e > 0$ is maintained over all the mode frequencies.

ADVANTAGES WITH THE PRESENT INVENTION (1) There is less interference with respect to high response of the constant current control which is the basic control of the dc transmission. Since a stabilization signal is obtained through a filter tuned to the shaft torsional oscillation frequency of the generator to add the stabilization signal to the output side of the regulator using an open loop, when the shaft torsional frequency is stabilized, the stabilization signal disappears. Since a bandpass filter is provided in the signal path, there is less interference with respect to the basic control system by other frequencies.

(2) Conventional basic control system can be applied as it is. Where there is the problem of the shaft torsional oscillation, it is possible to add the stabilization signal later. In general, mode frequencies of shaft torsional oscillations are known values for individual plants and the number of modes is not so many. Since the apparatus according to the present invention provides optimum stabilization signals for low, medium and high frequency ranges of the shaft torsional oscillation frequency, it is sufficient to design these signals differently from the basic control to add them. Accordingly, the countermeasure for the shaft torsional oscillation frequency can be completely independently taken with the conventional basic control system being as it is, resulting in small burden in control system design.

(3) Since the stabilization signal is constituted with easily available components at a convertor station, there is a little problem in practical use. The synchronous phase of PLL is utilized as the generator phase $\theta_G$ necessary for obtaining d, q axis components.

What is claimed is:

1. An apparatus for stabilizing turbine generator shaft torsional oscillations including:

(a) a current detector for detecting ac current of a turbine generator used in combination with a dc power-transmission system;

(b) a filter to which an output of said current detector is delivered, said filter comprising a first bandpass filter for detecting a sub synchronous component $(f_1 - f_m)$ and a second bandpass filter for detecting a super synchronous component $(f_1 - f_m)$ where fundamental frequency of said generator is represented by $f_1$ and a natural frequency of the mechanical shaft system of said generator is represented by $f_m$;

(c) a calculation circuit for applying conversion of at least one of d and q axis to respective outputs from said first and second bandpass filters using a generator phase $\theta_G$ to take out at least one of $\Delta i_d$ and $\Delta i_q$ of the sub and super synchornous components;

(d) a third bandpass filter to which an output from said calculation circuit is fed, said third bandpass filter for taking out a stabilization signal therefrom, and a circuit for controlling a converter for delivering an output of said generator to said dc power-transmission system on the basis of said stabilization signal.

2. An apparatus as set forth in claim 1, wherein there is provided means for detecting said generator phase $\theta_G$ from a synchronizing circuit in said circuit for controlling said converter as a synchronous phase output $\theta_{op}$.

3. An apparatus as set forth in claim 2, further comprises a fourth bandpass filter for taking out said natural frequency $f_m$ from said synchronous phase error change $\Delta\theta_{ep}$, an output from said fourth bandpass filter being delivered to said converter.

* * * * *